2,945,915

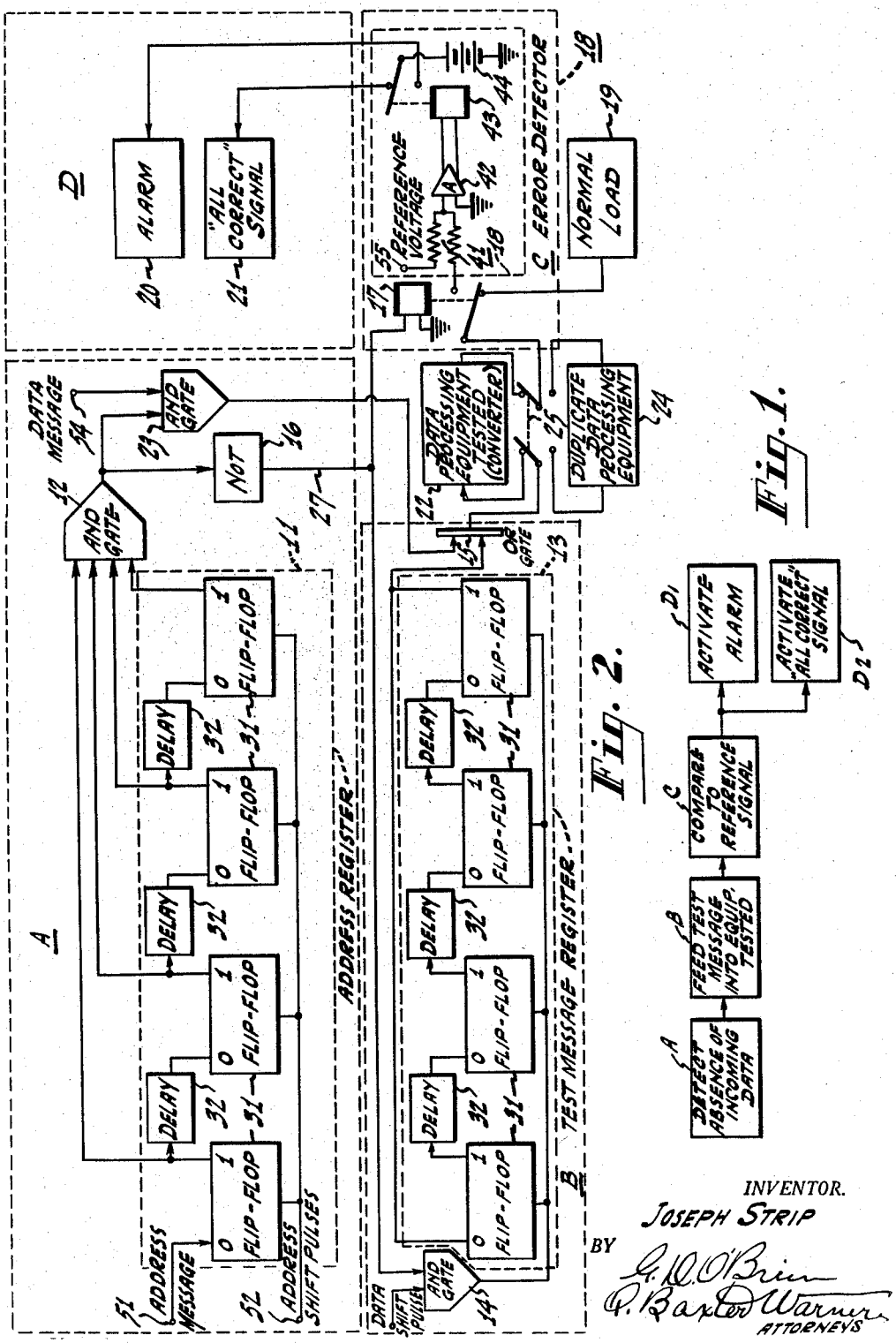

OPERATIONAL CHECKOUT OF DATA HANDLING EQUIPMENT

Joseph Strip, Haddonfield, N.J., assignor, by mesne assignments, to the United States of America as represented by the Secretary of the Navy Filed Jan. 28, 1958, Ser. No. 711,760

2 Claims. (Cl. 178—69)

This invention relates to an improved apparatus and method for testing the operability of data processing systems during operation.

Normally data processing systems are tested during regular periods of non-operation by programmed checks and by marginal checking procedures. However, in equipment which is used continually, such as parts of a radar warning system, it is necessary to be able to check the operability of such equipment without interrupting normal operation.

Several methods for testing data processing systems during operation have been developed, such as transfer checks and parity checks. However, these were not thorough enough, as in the case of parity checks, or were unable to test data after it had been operated on by the data processing system, as in the case of transfer checks. Also many methods of testing operability during operation by using duplicate and triplicate equipment have been devised, but these are very expensive in terms of equipment needed to perform a distinct operation.

A general object is to provide improved means for and method of testing the operability of data processing systems while they are in operation.

A further object is to provide such improved means for and method of such testing which may be used in any data processing system whose data input signals are received on a time-shared basis.

Another object is to provide such improved means for and method of such testing which automatically sounds an alarm or switches alternate data processing equipment into operation when the test detects faulty operation of the equipment being tested.

Another object is to provide such improved means for and method of such testing which does not interfere in the normal operation of the data processing equipment.

The foregoing objects may be accomplished by using, in a data processing system, a method comprising the following three steps, and apparatus capable of accomplishing these three steps.

The first step is to insert test messages into the dead time in the data message train. This step may be accomplished remotely by inserting such test messages having distinctive addresses into pre-assigned dead time in the message train. Or, it may be done in the equipment being tested by inserting such test messages whenever that equipment detects the absence of incoming data addressed to it.

In the first case the distinctive address causes the output of the equipment to be switched from its normal load or loads to an error detector. In the second case the detection of the dead time may cause the switching of the output from its normal load or loads to the error detector.

The second step is to compare the output of the data processing equipment due to these test messages to a reference signal. This is accomplished by the error detector.

These messages may be digital or may be converted from digital to analog in the data processing equipment. The reference signal may be a digital number or group of numbers to be compared with a digital output, or a voltage level to be compared with an analog output.

The third step is to use the difference between the output of the equipment due to the test signal and the reference signal to control the activation of an alarm or the switching in of an alternate data processing system.

The apparatus to perform the first step consists of means for feeding test messages to said system. This may be responsive to either a distinctive address or to the absence of a message train addressed to the equipment being tested.

The second step may be performed by a circuit which will subtract one signal from another. This may be done with either digital or analog signals.

After such subtraction, any discrepancy becomes an error signal, which may be used to energize switching means to carry out the third step.

The invention will be described in greater detail by reference to the accompanying drawings wherein:

Fig. 1 is a block diagram of a form of the method; and

Fig. 2 is a block schematic circuit diagram of a preferred embodiment useful for accomplishing the steps of the method.

The method of the invention shown in Fig. 1 may be used by the equipment tested to test itself, whenever data addressed to that equipment is not being received. At the end of the test signal either an all correct or an alarm is signalled.

The first step A of the method is to detect the absence of incoming data which is addressed to the equipment being tested. This is necessary because the equipment may be tested at any time it is not processing data, but no tests may be made when such data is being processed.

In any time-shared data processing system, a message has at least two parts; an address, and the data. Equipment which handles data on a time-shared basis must have means to detect the presence of its own address to know which data to process and which to ignore. The same means may be used to detect the absence of its address by reversing a process in the detecting means.

In the second step B, a test message is fed into the equipment being tested. This is performed when the absence of incoming data addressed to the equipment being tested is detected. During this step, a test message is pulsed out of its storage device and used as an input to the equipment during the time that data is normally received as a replacement for the data which is addressed to another unit.

In the third step C, the test output of the equipment being tested is compared to a reference signal. The reference signal is determined by the test output signal expected from the equipment being tested if the equipment is functioning correctly. The easiest way to compare these two signals electrically is to subtract one from the other. With analog signals this is done by using opposite polarity signals. With digital signals this is done by using the complement of one number. After subtraction, any discrepancy becomes an error signal.

Such an error signal may be used to accomplish the fourth step D, the activation of either an "all correct" signal D2 or an alarm D1. The error signal itself may be used to activate the alarm. The "all correct" signal may be so connected that it is activated if the alarm is not.

A typical embodiment of the equipment needed to achieve the steps of the method illustrated in Fig. 1 is illustrated in Fig. 2.

The first step A of Fig. 1, detecting the absence of incoming data addressed to the data processing system being tested, is performed by a decoding circuit comprising an address register 11, a four-input AND gate 12, a first two-input AND gate 23, and a NOT circuit 16. Also, connections to sources of the address message 51, address shift pulses 52, and the data message 54 are included. The address register 11, when operated simultaneously by the address message and by the address shift pulses, stores one bit of the address message in each of its flip-flop circuits 31. The operation of this circuit is explained in Millman and Taub, Pulse and Digital Circuits, Fig. 13–27, page 413. Although only four flip-flop circuits 31 are shown, there may be any number in the register 11, connected as shown. The AND gates and the NOT circuit may be of any standard electrical type. Several examples of each are shown in Millman and Taub. An AND gate (such as are shown at 12, 14, 23 in Fig. 2), performs the logical "and" function. If all its inputs are activated, it produces an output signal. If less than all its inputs are activated, there is no output signal. The NOT circuit 16 performs the logical "not" function. For no input signal there is an output signal on its output. However, there is no output signal when the input is activated. A plate loaded triode or an inverting pulse transformer with a D.-C. restoring circuit may be used. The four input AND gate 12 is driven by the "one" state output of each of the flip-flops 31 of the address register 11, and drives the NOT circuit 16 and one input of the two-input AND gate 23.

If the address of the data processing equipment comprises the four-bit number, 1111, and one bit of the test address is fed into each flip-flop 31, each flip-flop circuit 31 is set in its "one" state. The output of the "one" state of each of the four flip-flop circuits 31 activates one input of the four-input AND gate 12. When the address 1111 is received by the address register 11, all four inputs of the AND gate 12 are therefore activated, and the AND gate 12 produces a signal. This signal activates one input of the two-input AND gate 23 and de-activates the output of the NOT circuit 16. The data in the message is passed from the data input terminal 54 through the two-input AND gate 23 to the data processing equipment tested 22.

If any other address is received, some of the flip-flops 31 of the register 11 are not triggered. Some of the four inputs to the AND gate 12 are not activated, so it produces no output signal. Thus, one input of the two-input AND gate 23 is not activated, so that data in the message is blocked from passing from the data terminal 54 through that gate to the data processing equipment tested 22. The NOT circuit 16, since it has no input from the four-input AND gate 12, will produce an output signal on its output line 27.

The second step B, feeding the test message into the data processing equipment tested 22, is achieved by a test message register 13, a second two-input AND gate 14, and an OR gate 15. The test message register 13 also operates as the circuit explained in Millman and Taub, Fig. 13–27, page 413. The OR gate performs a logical "inclusive-or" function. If any input or group of inputs is activated, there is an output signal. It may be of any standard electrical type such as those shown in Millman and Taub. The second two-input AND gate 14 is activated by the output of the NOT circuit 16 and the data shift pulses. It drives the test message register 13 whose output is put through the OR gate 15 to the data processing equipment tested 22.

If a message is addressed to the data processing equipment tested 22, the second two-input AND gate 23 will be activated and data in the message is passed through it and the OR gate 15 to the data processing equipment tested 22. At the same time there is no output signal from the NOT circuit 16 on its output line 27, so data shift pulses are blocked from passing through the second two-input AND gate 14 and operating test message register 13. However, if the message is not addressed to the data processing equipment tested 22, the NOT circuit 16 produces an output signal on its output line 27 as explained above, activating one input of the second two-input AND gate 14 so that data shift pulses operate the test message register 13. The test message which is stored in the test message register 13 is pulsed out of that register by the data shift pulses, passes through the OR gate 15 and operates the data processing equipment 22.

The data processing equipment tested 22 may be a digital-to-analog converter, or it may be the arithmetic section of a digital computer. The output of this equipment drives a normal load or loads 19. The converter might drive a group of analog storing devices. The arithmetic section of the computer might feed its output into a register or into print-out equipment.

In the design as actually tested, the converter is used. The circuit used for the converter is standard in the art. An example of such a circuit is shown in U.S. Patent 2,731,631, S. W. Spaulding (January 17, 1956). It consists of a series of switches and a network of resistors so arranged as to produce a voltage level output whose magnitude is a function of the numerical value of the digital input it receives.

The third step C, is comparing the test output of the data processing equipment tested 22 to a reference signal. This is accomplished by a first relay 17 and an error detector 18. The relay 17 is activated by the Not circuit 16 when the absence of data addressed to the data processing equipment tested 22 is detected. When the relay 17 is activated, the output of the data processing equipment tested 22 is switched from its normal load or loads 19 to the error detector 18. This is done so that the test signal will not affect any operations which are then in progress in the data processing system. The error detector 18 consists of a pair of mixing resistors 41, one resistor is connected to the output of the data processing equipment tested 22 through relay 17 and the other resistor is connected to a source of reference voltage signal 55, an amplifier 42 biased beyond its cut-off point and driven by the output from the mixing resistors 41, and a second relay 43 driven by the amplifier. The reference voltage signal is equal in magnitude, but opposite in polarity to the test output signal expected if the data processing equipment tested 22 is functioning correctly. When the magnitude of the two voltages is in agreement, there is no output from the two mixing resistors 41. When the magnitudes differ, there is an output signal from the mixing resistors 41 to the amplifier 42. When the output from the two mixing resistors 41 becomes larger than the bias voltage on the amplifier 42, there is an output signal from the amplifier 42. The amplifier 42 acts as a switch. The bias voltage may be used to control the inaccuracy permissible in the data processing equipment tested 22. When there is an output from the amplifier 42, the second relay 43 is energized.

This accomplishes the fourth step D, activating either an "all correct" signal or an alarm. When the second relay 43 is energized by the amplifier 42, the alarm 20 is activated by a source of potential 44 through the contacts of the second relay 43. The alarm may be a red light in the control panel of the data processing system. When the second relay 43 is not activated, an "all correct" signal is energized through the normally closed contact of the relay 43. This might be a green light in the control panel.

Duplicate data processing equipment 24 may also be provided so that, when the alarm 20 is actuated, the alternate unit 24 may replace the data processing equipment tested 22 until that equipment is again functioning properly. This may be done by operating a switch 25. The operation of switch 25 may be done manually by the operator or automatically by activating a relay coil with the same signal which operates the alarm 20.

Obviously modifications and variations of the present invention are possible in the light of the above teachings.

It is therefore to be understood that within the scope of the appended claims the invention may be practiced otherwise than is specifically described.

I claim:

1. Apparatus for testing a high speed data processing system for correct manipulation of continuous input data during actual operation of said system comprising address register means for receiving the address portion of messages directed to said data processing system, detecting means responsive to the output of said address register means for sensing the absence of input data in a continuous message train addressed to said data processing system, a test message register, means responsive to and synchronized with the output of said detecting means for activating said test message register and connecting the test data output of said test message register as input to said data processing system, a normal output load connected to said data processing system, a reference signal source, comparator means connected to said reference signal source for comparing the reference signal from said reference signal source with the test data output signals from said data processing system, switching means responsive to the output of said detecting means for switching the output of said data processing system from said normal output load to said comparator means, and indicating means responsive to the output of said comparator means for indicating the correctness of functioning of said data processing system.

2. Apparatus for testing a high speed time-shared data processing system for correct manipulation of continuous message train input data during actual operation of said system comprising address register means for receiving a plurality of address shift pulses and the address portion of messages directed to said data processing system, first AND gate means responsive to the outputs of said address register means for detecting the presence of input data in a continuous message train addressed to said data processing system, NOT circuit means responsive to the absence of output from said first AND gate means corresponding to an absence of data in the continuous message train addressed to said data processing system, a test message register, second AND gate means responsive to the simultaneous existence of a plurality of shift pulses and output from said NOT circuit means for activating said test message register and connecting the test data output of said test message register as input to said data processing system, a normal output load for said data processing system, an electrical voltage reference signal source, error detecting means connected to said voltage reference source for comparing the voltage reference signal from said reference signal source with the test data output signals from said data processing system and producing an output which is a function of the discrepancy between said voltage reference signal and said test data output signals, electrical relay switching means responsive to the output of said NOT circuit means for switching the output of said data processing system from said normal output load to said error detecting means, and indicating means responsive to the output of said error detecting means for indicating the correctness of functioning of said data processing system.

References Cited in the file of this patent

UNITED STATES PATENTS

| | | |
|---|---|---|
| 2,044,519 | Usselman | June 16, 1936 |
| 2,132,124 | Peterson | Oct. 4, 1938 |
| 2,706,215 | Van Duuren | Apr. 15, 1955 |
| 2,827,623 | Ainsworth | Mar. 18, 1958 |